United States Patent
Rodriguez et al.

(10) Patent No.: US 7,826,351 B2
(45) Date of Patent: Nov. 2, 2010

(54) MMPP ANALYSIS OF NETWORK TRAFFIC USING A TRANSITION WINDOW

(75) Inventors: Jorge R. Rodriguez, Cary, NC (US); Kaiqi Xiong, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 11/966,286

(22) Filed: Dec. 28, 2007

(65) Prior Publication Data
US 2008/0101228 A1      May 1, 2008

Related U.S. Application Data

(63) Continuation of application No. 10/417,467, filed on Apr. 16, 2003, now Pat. No. 7,330,427.

(51) Int. Cl.
*H04L 12/26* (2006.01)
(52) U.S. Cl. .................. 370/229; 370/235; 370/235.1
(58) Field of Classification Search ............... 370/230, 370/252, 229, 231, 235, 389, 253, 232, 235.1, 370/238
See application file for complete search history.

(56) References Cited

U.S. PATENT DOCUMENTS

| | | | | |
|---|---|---|---|---|
| 5,343,465 A * | 8/1994 | Khalil | | 370/232 |
| 5,583,792 A | 12/1996 | Li et al. | | 364/514 |
| 5,848,057 A | 12/1998 | Lee et al. | | 370/232 |
| 5,886,907 A | 3/1999 | Abu-Amara et al. | | 364/578 |
| 6,075,770 A | 6/2000 | Chang et al. | | 370/230 |
| 6,304,549 B1 | 10/2001 | Srinivasan et al. | | 370/230 |
| 6,310,857 B1 | 10/2001 | Duffield et al. | | 370/232 |
| 6,377,545 B1 | 4/2002 | Onyiagha | | 370/230 |
| 6,445,707 B1 | 9/2002 | Iuoras et al. | | 370/395.43 |
| 6,449,282 B1 | 9/2002 | Loher | | 370/447 |
| 6,526,259 B1 | 2/2003 | Ho | | 455/67.11 |
| 6,715,005 B1 | 3/2004 | Rodriguez et al. | | 710/41 |

OTHER PUBLICATIONS

2001 ACM Symposium on Applied Computing, entitled "The sustainable cell-rate usage control with adjustable window for high-speed multimedia communications", Chen et al., Mar. 2001, pp. 467-471.

(Continued)

*Primary Examiner*—Brenda Pham
(74) *Attorney, Agent, or Firm*—Patrick J. Daugherty; Driggs, Hogg, Daugherty & Del Zoppo Co., LPA

(57) ABSTRACT

Data communication in network traffic is modeled in real time and is analyzed using a 2-state Markov modified Poissen process (MMPP). The traffic inter-arrival times for bursty and idle states define a transition window $[\lambda^1_{max}, \lambda^2_{min}]$ represented by the boundary values $\lambda^1_{max}$ for the inter-arrival time for bursty traffic, and $\lambda^2_{min}$ for the inter-arrival time for idle traffic. Changes in the values of $\lambda^1_{max}$ and $\lambda^2_{min}$ are tracked over time, and the size of the transition window is enlarged or decreased based upon relative changes in these values. If the inter-rival times for the bursty state and the idle state become approximately equal, the model defaults to a single state model. The modeling is applicable to the synchronization of polling and blocking in a low-latency network system. This permits the adoptive selection of poll or block to maximize CPU utilization and interrupt latency.

7 Claims, 5 Drawing Sheets

OTHER PUBLICATIONS

ACM SIGCOMM Computer Communication Review, vol. 23, Issue 4, entitled "HAP: A new model for packet arrivals", Lin et al., Oct. 1993, pp. 212-223.

Institute of Electronic Engineers Journal, vol. 3, entitled "Heavy traffic multiplexing behavior of highly-bursty heterogeneous source and their admission control in high-speed networks", Sohraby, K., Dec. 1992, pp. 1518-1523.

A Real-time Algorithm for 'Burstiness' Analysis of Network Traffic, Khalil, Bell Communications Research, 1992, IEEE.

"The Effect of Bursty Traffic on the Performance of Local Area Networks", Khalil et al, Bellcore, 1992, IEEE.

"How does TCP generate Pseudo-self-similarity?", Guo et al, Boston University, 2001 IEEE.

* cited by examiner

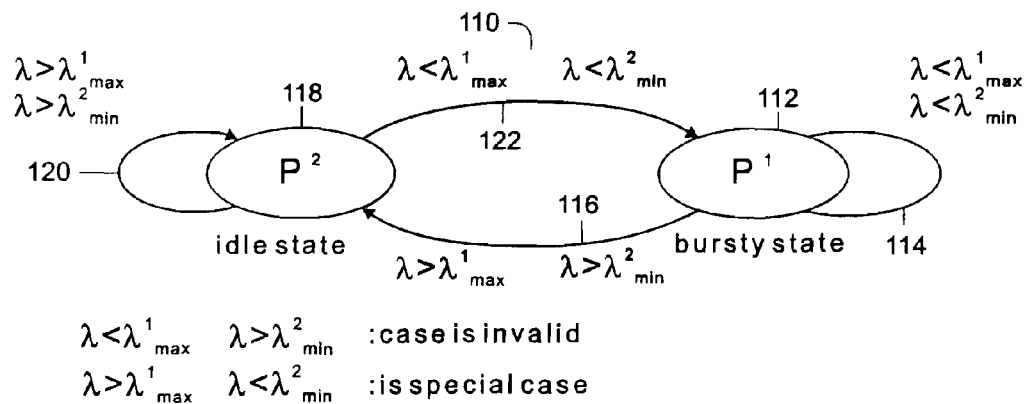
Fig: 1
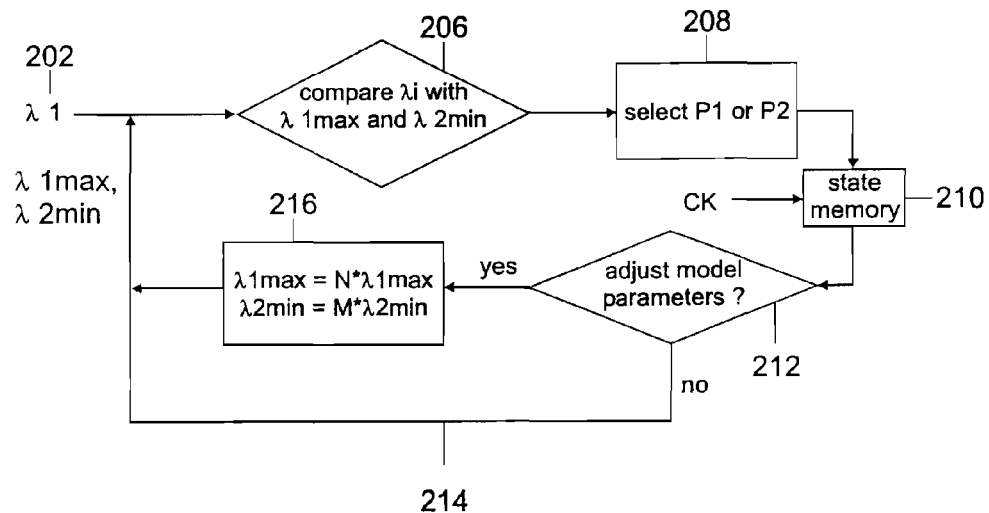
Fig: 2

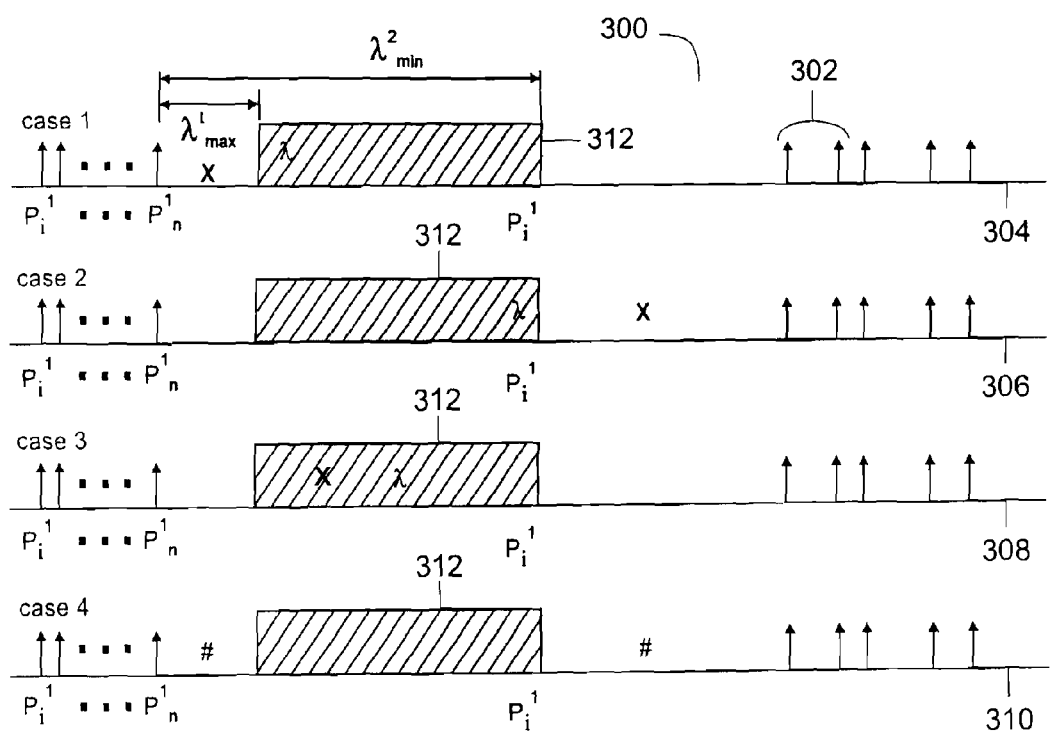
Fig: 3

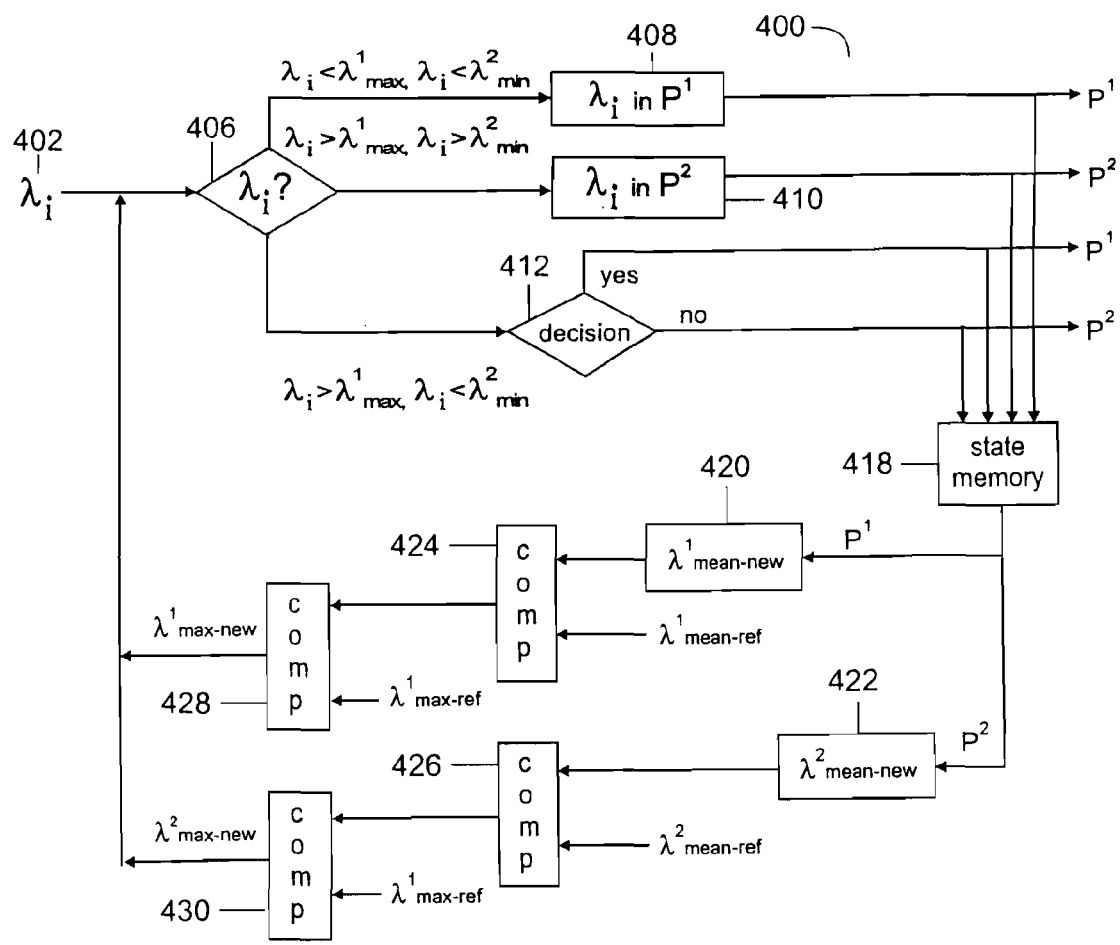
Fig: 4

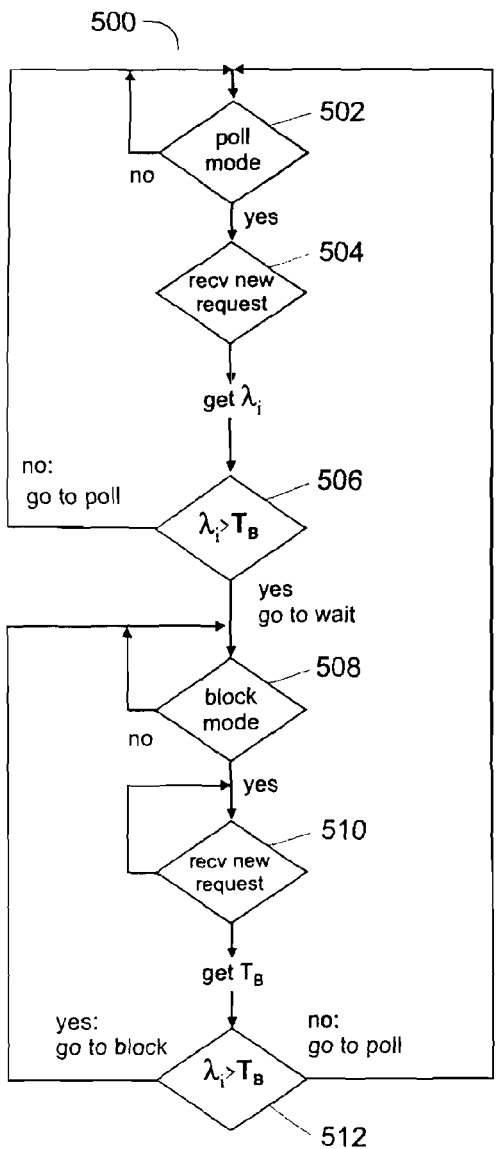
Fig: 5

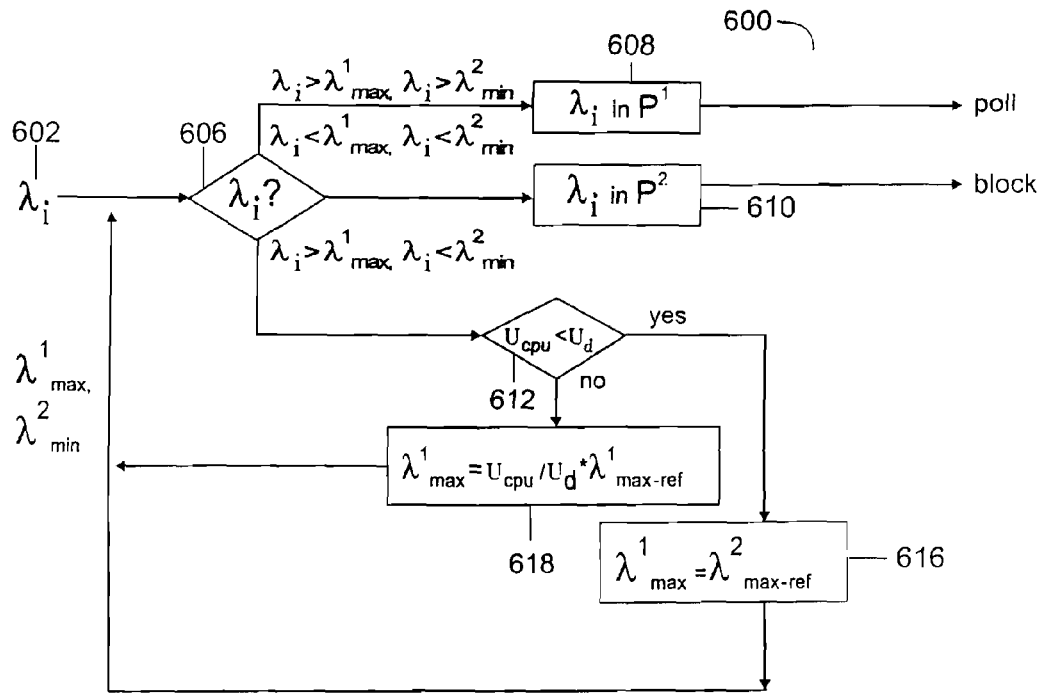
Fig: 6
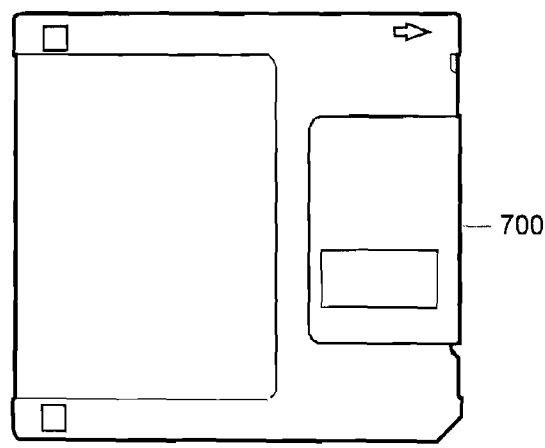
Fig: 7

MMPP ANALYSIS OF NETWORK TRAFFIC USING A TRANSITION WINDOW

CROSS REFERENCE TO RELATED APPLICATIONS

This application is a continuation of application Ser. No. 10/417,467, filed Apr. 16, 2003, now U.S. Pat. No. 7,330,427 B2.

The present application is related to the following U.S. patent applications: U.S. Ser. No. 09/607,013 filed Jun. 29, 2000, entitled "Method and System for Reducing Latency in Message Passing Systems, now U.S. Pat. No. 7,615,005 U.S. Ser. No. 09/607,113, filed Jun. 29, 2000, for "Method and System for Predicting Inter-Packet Delays" now abandoned, and U.S. Ser. No. 10/417,468, filed Apr. 16, 2003, for "Multilevel Analysis of Self-Similar Network Traffic". The content of these cross-referenced applications is hereby incorporated herein by reference.

FIELD OF THE INVENTION

This invention relates in general to the field of computer technology, and particularly to systems for the transfer of data. More specifically, the invention relates to the real-time modeling and analysis of the data communication aspect of network traffic.

BACKGROUND OF THE INVENTION

The flow of information in a network is often called 'traffic'. Units of information used in network communication are referred to as 'packets'. Packets generally arrive at a point in the network at random intervals resulting in 'bursts' of traffic, causing congestion and 'idle' periods in which traffic is somewhat more sparse.

Systems that use a network for communication can benefit from the analysis and characterization of the network traffic to optimize the critical performance parameters that are involved in that communication. An example of the application of this type of analysis is the synchronization of a user process with the completion of the receive operation at the system to network interface. A common design problem with this process is the need to determine when the receive data is available at the input buffers. The method of synchronization used can directly affect the latency of the receive operation and the utilization of the host computer processor. One way to do the analysis of the network traffic is to provide a model that recognizes the characteristics of the network traffic. Since network traffic has been shown to be bursty, a method used to analyze network traffic should be able to represent behavior that is bursty.

Different methods are known for analyzing and characterizing network traffic. The Poisson Process is widely utilized to model aggregate traffic from voice sources. Bursty traffic has been shown to be approximated by a Markov modulated Poisson process (MMPP). An MMPP model can be a very effective means to provide effective network traffic analysis of data communication, either in batch mode or, preferably, in real time.

Low-latency network architectures provide special mechanisms to improve the performance of the network interconnect in message-passing systems. The synchronization of the user process with the completion of the receive operation at the network interface card (NIC) has the common design problem that it needs to be determined when receive data is available at the input buffers. One of the mechanisms used for synchronization is interrupts (blocking), but the problem with interrupts is that they can add to the cost of synchronization with excessive latency and CPU utilization. Polling is a mechanism intended to help reduce the high latency of interrupts by polling on a completion signal as an alternative to waiting for an interrupt as a method to synchronize the user process with the completion of the receive operation. If the polling is done from user space, then the time needed for kernel transitions is saved, thus reducing the latency of the operation even further. The polling operation, however, uses the host processor during the time it is polling the completion flag. Therefore, if the message arrival delay exceeds the interrupt time, then the increase in host processor utilization will actually have a negative impact on the performance of the application. It becomes necessary to select between polling and blocking (waiting for the interrupt) depending on the delay of the message. Therefore, two important concerns regarding the performance of the network interconnect are the overall latency of the message communication and the CPU overhead involving the send and receive primitives. The goal is to balance the latency requirements with the host processor utilization requirements to obtain the best performance for the various arrival patterns experienced at the NIC receive input port.

SUMMARY OF THE INVENTION

The present invention describes a method for the real-time analysis of network traffic based on a 2-state MMPP model The method can be used at the user-network interface during data transfer for the synchronization of a user process with the completion of the receive operation. A transition window $[\lambda^1_{max}, \lambda^2_{min}]$ is used to analyze the state transition parameters corresponding to the packet inter-arrival time between the bursty state and the idle state.

Among the advantages of using this transition window are: a) the accuracy of the selection; b) the ability to use dynamic algorithms that are adaptive to the workload; and c) the flexibility of the dynamic algorithms to adaptively adjust the burst length (busty state) to satisfy the requirements of the user process. Further advantages of the present invention include, for example, 1) a reduction in system storage requirements, since it is not necessary to store all received packets for further off-line analysis; 2) immediate real-time availability of information from the analysis for administrative and management purposes to identify or alleviate network problems; 3) availability of current usage information when resources, such as memory buffers or communication bandwidth, are otherwise allocated to support specific services; and 4) a reduction of dependency on human intervention, allowing for the fully automated future network management systems.

The invention includes a method and a system for adaptively analyzing communication of packets of data in a network traffic using a 2-state MMPP model. The inter-arrival $\lambda_i$ time of individual data packets is determined, as well as whether the packet arrival rates are 'bursty' ($\lambda^1$) representing heavy traffic conditions or 'idle' ($\lambda^2$) representing light traffic conditions. A transition window is established with the values $\lambda^1_{max}$ and $\lambda^2_{min}$ representing the transition between bursty traffic and idle traffic. The probability $\rho$ is determined as to whether a packet inter-arrival time is occurring in bursty traffic $\rho^1$ or in idle traffic $\rho^2$. The analysis of network traffic can be carried out in real-time. Typically, the bursty packet inter-arrival time has a mean value of $\lambda^1_{mean}$, the idle packet inter-arrival time has a mean value of $\lambda^2_{mean}$, and the traffic characteristics are such that $\lambda^1_{mean} \ll \lambda^2_{mean}$. As the value for $\lambda^1_{mean}$ begins to approximate the value for $\lambda^2_{mean}$, the model can be set to default to a single state MMPP model. Changes in the values of $\lambda^1_{max}$ and $\lambda^2_{min}$ can be tracked over time and the size of the transition window can be enlarged or decreased based upon relative changes in these values.

BRIEF DESCRIPTION OF THE DRAWINGS

The understanding of the present invention is facilitated by reference to the following flow diagrams, timing diagrams and other drawings as follows.

FIG. 1 is an illustration of an MMPP for modeling burst and idle network traffic;

FIG. 2 is a flow diagram showing the correlation of MMPP model parameters;

FIG. 3 describes four possible models of a network traffic stream;

FIG. 4 is a state diagram of the MMPP model;

FIG. 5 is a logic flow diagram;

FIG. 6 is a flow chart showing implementation of adaptive selection of CPU utilization deadlines; and FIG. 7 shows a magnetic disc symbolizing a medium for the execution of the program.

DETAILED DESCRIPTION OF THE INVENTION

An illustration of a 2-state MMPP model is shown in FIG. 1. The model 110 is a bimodal sequencer that serves to predict inter-message arrival delays. It consists of a "bursty" state 112 represented as $P^1$, with a high packet arrival rate, and an "idle" state 118 represented by $P^2$, with a low packet arrival rate. The bursty state describes the network traffic when a burst of packets 114 occurs during heavy traffic conditions. During these bursts, the packet inter-arrival time is much smaller than the average packet arrival time, and is Poisson distributed with a mean inter-arrival time of $\lambda^1_{mean}$. The idle state 118 describes the network traffic 120 between bursts, when the traffic is light and the Poisson distributed packet inter-arrival time has a mean value $\lambda^2_{mean}$. When the packet inter-arrival time is less than $\lambda^1_{max}$ and $\lambda^2_{min}$, all arrivals are in the bursty state. When the times are all above $\lambda^1_{max}$, the arrivals are in the idle state. When the inter-arrival time slows down so that $\lambda > \lambda^2_{min}$ and $\lambda > \lambda^1_{max}$, the model transitions at 116 from the bursty state to the idle state. Conversely, when the arrival time becomes faster and $\lambda < \lambda^2_{min}$ and $\lambda < \lambda^1_{max}$, the model returns along 122 to the bursty state.

For the 2-state MMPP model to be a valid representation of the network traffic, the behavioral characteristics of the traffic are such that $\lambda^1_{mean} << \lambda^2_{mean}$. In the model, the traffic inter-arrival times for the bursty and idle states are represented by the boundary values $\lambda^1_{max}$ and $\lambda^2_{min}$ respectively. For the special case where $\lambda^1_{mean}$ is approximately equal to $\lambda^2_{mean}$ the model defaults to a single state model. This is explained in greater detail below. These values are used as the transition criteria between bursty and idle states, as shown in FIG. 1.

Since the representation of the network traffic in a model is an approximation, the length of the burst during state $P^1$ is an approximation with burst edges that are defined somewhat arbitrarily. In practice, the burst length is defined to satisfy the requirements of the user process. For example, in the synchronization of a user process with the completion of the receive operation at the system to network interface, the burst length is defined to aid in the selection between polling and blocking, in which case the burst length is determined by the interrupt latency time. As previously noted, the traffic inter-arrival times for the bursty and idle states are represented by the boundary values $\lambda^1_{max}$ and $\lambda^2_{min}$, respectively. These boundary values define a transition window [$\lambda^1_{max}$, $\lambda^2_{min}$] that has as the left side the parameter $\lambda^1_{max}$ and the right side the parameter $\lambda^2_{min}$. The parameter $\lambda^1_{max}$ determines an upper boundary for the packet inter-arrival time for the bursty state while $\lambda^2_{min}$ is the parameter that determines a lower boundary for the packet inter-arrival time for the idle state. For the bursty state, $\lambda^1_{max}$ defines the probability $p^1$ that a packet with inter-arrival time lower than $\lambda^1_{max}$ belongs to the bursty state. Similarly, for the idle state, $\lambda^2_{min}$ defines the probability $p^2$ that a packet with inter-arrival time higher than $\lambda^2_{min}$ belongs to the idle state. Based on these probabilities, a decision can be made for each arriving packet of the particular state transition induced by the arrival.

Algorithms are described that allow the model to track changes in the network traffic dynamically. As the network traffic characteristics change over time, the mean inter-arrival times for the bursty state ($\lambda^1_{mean}$) and for the idle state ($\lambda^2_{mean}$) also change over time. For the model to track these changes over time, the values $\lambda^1_{max}$ and $\lambda^2_{min}$ change in proportion to the changes in the traffic. The time values $\lambda^1_{max}$ and $\lambda^2_{min}$ define the sides of a transition window of length $k = \lambda^2_{min} - \lambda^1_{max}$. The size of the transition window [$\lambda^1_{max}$, $\lambda^2_{min}$] can be changed dynamically to be used in adaptive algorithms that control the process transition between states. For implementation in an algorithm used in that fashion, the transition window [$\lambda^1_{max}$, $\lambda^2_{min}$] can become larger or smaller by changing the value of $\lambda^2_{min}$ and $\lambda^1_{max}$ accordingly. The specific value of the parameters used depends on the specific application of the algorithm.

FIG. 2 shows a diagram for the state machine view of the algorithm that uses the transition matrix as the basis of the next state transition. A current inter-arrival time $\lambda_i$ 202 is compared at 206 with the maximum burst time $\lambda^1_{max}$ and the minimum idle time $\lambda^2_{min}$. Based on this, either $P^1$ or $P^2$ is selected at 208 based on whether the value for $\lambda_i$ is more likely to belong to the bursty state or the idle state. This selection goes into state memory 210 and a decision is then made at 212 whether to adjust the model parameters. If the answer is yes, the new values for $\lambda^1_{max}$ and $\lambda^2_{min}$ are determined at 216 and are sent to be compared at 206. If no adjustment is required, the old values are returned for further comparison.

Examples of the use of this algorithm are:

a) the model adapts dynamically to changes in the workload, and b) the burst length (bursty state) is adjusted to satisfy the requirements of the user process.

Although typically the network traffic can be characterized as being bimodal and thereby described by the MMPP model, a special case occurs under light traffic conditions where the network traffic can be characterized by a simple Poisson distribution. As traffic intensity goes down, the mean inter-arrival time $\lambda^1_{mean}$ of the bursty state approaches that of the idle state inter-arrival time $\lambda^2_{mean}$ to the point where the two are no longer distinguished by the model. When the characteristics of the traffic are such that $\lambda^2_{mean}$ approximately equals $\lambda^1_{mean}$, a single state in the MMPP model is used to represent the network traffic.

Packet arrivals and inter-burst transitions are detected in the following manner. Assume that packet $P_{i-1}$ presently belongs to burst state $P^1$. Then, the task is to detect whether packet $P^1$ belongs still to burst state $P^1$ or to the idle state $p^2$. The detection logic compares the incoming packet inter-arrival time $\lambda_i$ with $\lambda^1_{max}$ and $\lambda^2_{min}$. This is illustrated in FIG. 3 wherein the packet arrivals are shown as vertical arrows 302. For this scenario, there are four possible cases, shown as Case 1 (304), Case 2 (306), Case 3 (308) and Case 4 (310). The transition window $[\lambda^1_{max}, \lambda^2_{min}]$ is illustrated here as a shaded rectangle 412 and the incoming packet $P^1$ is illustrated as an X.

Case 1. $\lambda_i < \lambda^1_{max} < \lambda^2_{min}$: $P_i$ is detected to belong to burst state $P^1$.

Case 2. $\lambda_i > \lambda^2_{min} > \lambda^1_{max}$: $P_i$ is detected to belong to idle state $P^2$.

Case 3. $\lambda^1_{max} < \lambda_i < \lambda^2_{min}$: $P_i$ is detected to be inside of the transition window $[\lambda^1_{max}, \lambda^2_{min}]$ In this case, the next state transition which is selected is dependent upon the user process requirements. As will be shown, this method can be applied to improve the performance of the network attached devices. In particular, application of the transition window approach to manage the synchronization process in low-latency, high-bandwidth networks will be shown.

Case 4. $\lambda_i < \lambda^1_{max}$ and $\lambda_i > \lambda^2_{min}$: This is not a valid combination because both cannot occur with $\lambda^1_{max}$ being smaller than $\lambda^2_{min}$.

FIG. 4 shows how the model adjusts adaptively to changes in the workload and automatically makes a correction to the results in the selections of the transition between states. The boundaries established by the parameters $\lambda^1_{max}$ and $\lambda^2_{min}$ determine the model parameters. Therefore, the value of parameters $\lambda^1_{max}$ and $\lambda^2_{min}$ change automatically to reflect the mean inter-arrival time of the incoming traffic.

In this algorithm, it is not necessary to compute the mean inter-arrival time for the burst state and for the idle state after every arrival. If it is required to realize certain savings in computation for performance reasons, it is possible to do the computation of the mean inter-arrival time and to readjust the value of $\lambda^1_{max}$ and $\lambda^2_{min}$ upon receipt of every X number of packets, where X can be specified. The justification of this algorithm is explained as follows.

First, check 406 the inter-arrival time $\lambda_i$ 402 for the incoming packet. If the packet time is as indicated with a value that is less than $\lambda^1_{max}$ and $\lambda^2_{min}$, the probability is that it is belongs in burst packet $P^1$ 408. If the value is greater than $\lambda^1_{max}$ and $\lambda^2_{min}$, the probability is that it belongs in the idle packet $p^2$ 510. If the inter-arrival time $\lambda_i$ 402 for the incoming packet is within the transition window $[\lambda^1_{max}, \lambda^2_{min}]$ (Case 3), then the flow goes to 412, where a check is made of the current measurement and a decision is made whether to go to state $P_1$ for bursty or to $P_2$ for idle That decision is entirely application dependent. The decision as to whether the packet is bursty or idle goes into state memory 418. A reference value is given for the mean inter-arrival time in the bursty state $\lambda^1_{mean-ref}$ and a reference value for the mean inter-arrival time in the idle state $\lambda^2_{mean-ref}$. This gives the reference value for the transition window parameters $[\lambda^1_{max-ref}, \lambda^2_{min-ref}]$. Assume the network traffic characteristics change so that the mean inter-arrival time of the new traffic in the bursty state is $\lambda^1_{mean-new}$ (420) and the new mean inter-arrival time in the idle state is $\lambda^2_{mean-new}$ (422). Define the probability $p^1$ that a packet with inter-arrival time lower than $\lambda^1_{max}$ belongs to the bursty state. Define the probability $p^2$ that a packet with inter-arrival time higher than $\lambda^2_{min}$ belongs to the idle state. This usually is defined so that $p^1 \ll p^2$.

If $\lambda^1_{mean-new} = N * \lambda^1_{mean-ref}$ and $\lambda^2_{mean-new} = M * \lambda^2_{mean-ref}$, then the new transition window is determined at 428 and 430 as $$[\lambda^1_{max-new} = N * \lambda^1_{max-ref}, \lambda^2_{min-new} = M * \lambda^2_{min-ref}].$$

This is based on principles that can be proven mathematically by equating the integral of the exponential distribution with a mean value $\lambda^1_{mean-ref}$ from $\lambda^1_{max-ref}$ to infinity to the probability $p^1$. Then, the integral of the exponential distribution with a mean value $N * \lambda^1_{mean-ref}$ to infinity is also equal to $p^1$. From this follows the desired results. A similar derivation can be followed for the idle state.

The present invention also relates to the use of a transition window and an MMPP in a low-latency network user process synchronization in the following manner. Some of the policies for the implementation of polling and blocking (waiting for interrupts) are the optimal policy, the poll policy (or spin policy), the block (or wait for interrupt) policy and the poll-block policy. The following provides a summary of performance for the various policies. The symbols listed below are used:

$\lambda^d$ = the message arrival delay time (since the start of the synchronization period),
tLAT = receive latency (can exceed the arrival delay time),
tLAT-BOUND = bound for the receive latency,
tOH = the processor overhead due to polling and/or interrupt processing (time period),
tOH-BOUND = bound for the processor overhead,
tp = polling time: poll (tp).
tBLK = interrupt overhead time.

With the optimal policy, the receiving process can predict the delay of the expected message. If the delay is less than the interrupt overhead, then the process polls on a completion flag and the latency is minimized. If the delay is more than the interrupt overhead, then the process will block (will wait until it is interrupted) and excessive overhead due to polling is avoided. In practice, this policy is not realizable because there is no way that the process can predict exactly what the delay is for the expected message (although it can be approximated.) However, the optimal policy provides a good baseline for other methods that have as a goal to get as close to this bound as possible. For the optimal policy, the processor overhead (tOH) and transaction latency (tLAT) are as follows:

if $\lambda d < tBLK$, then poll:
  tOH = td,
  tLAT = td, if $\lambda d >= tBLK$, then block:
  tOH = tBLK,
  tLAT = td + tBLK, With the poll policy, the receiving process polls on a completion flag. This policy can provide good performance if the receive operation completes within a reasonably short amount of time. However, polling can consume processor utilization that could otherwise be used by the application. For the poll (tp) policy, the processor overhead (tOH) and transaction latency (tLAT) are:
  tOH = td,
  tLAT = td, With the block policy, the receiving process always blocks and waits for an interrupt to complete the receive operation. This policy is good when used to overcome the limitations of polling but, for short messages and frequent message arrivals, it contributes significant latency and processor overhead. For the block policy, the processor overhead (tOH) and transaction latency (tLAT) are:
  tOH = tBLK,
  tLAT = td + tBLK The poll-block policy does not attempt to predict the delay of the expected message, but instead attempts to "minimize its losses". With this policy, the process polls the completion flag for a time equal to the interrupt overhead. If it has not detected completion at the end of this time period, it blocks to wait for an interrupt. This policy achieves a cost that is no worse than twice that of the optimal policy (twice the interrupt overhead delay time). For the poll (tp)-block policy, the processor overhead (tOH) and transaction latency (tLAT) are:

if λd<tBLK, then the process polls for time td and:
    tOH=td, (tp=tBLK)
    tLAT=td, (tp=tBLK)

if λd>=tBLK, then the process polls for time λd=tp=tBLK and:
    tOH=td+tBLK,
    tLAT=td+tBLK, Bounding the message latency (tLAT):
    tLAT=tLAT-BOUND<=λd+tBLK, if λd<tBOUND Bounding the processor overhead (tOH)
    tp+tBLK<tOH-BOUND The present invention provides a solution to the problem of deciding between polling and blocking (waiting for interrupts) with a policy that attempts to make a prediction on what the delay of the expected message is likely to be. The decision on whether to poll or to block is made based on the Markov modulated Poisson process (MMPP) model characterizing the flow of traffic to a network adapter (for receive operations). The model characterizing the traffic and the parameters of the model are provided in a table, where the task making the poll vs. block is made. The performance of this policy will be between that of the optimal policy and the poll-block policy. If the prediction accuracy approaches 100%, then the cost will be closer to the optimal policy. If the prediction accuracy approaches 0%, then the cost will be closer to the poll-block policy. The accuracy of the prediction, as noted below, depends on the traffic and how effectively the algorithm can predict the presence of bursts in the traffic and the size of these bursts. Because of the bursty nature of network traffic, this approach can do much better than the poll-block policy, but no worse.

A diagram of the selection system is shown in FIG. 5. To implement the method, it is necessary to have a measurement of the traffic pattern as a reference on which to make predictions and the process obtains a time-stamp of the incoming packets. The time-stamp of two consecutive packets is recorded and the difference between the present incoming packet ($t_1$) and the previous packet ($t_2$) is recorded. The difference $\lambda^i = t_1 - t_2$, for the measurement in some interval i, is assumed to be representative of the traffic pattern with some level of error.

There are two main cases to consider: bursty traffic or non-bursty traffic. If the traffic is bursty, then the value for the $\lambda_i$ measurements is compared with $T_B$ at 506 and 512. If $\lambda_i < T_B$, then polling is used and the decision is made to continue polling 506 to 502. If, on the other hand, $\lambda^i > T_B$, then blocking is used and the decision is made to continue blocking (512 to 508) or to go from polling to blocking (506 to 508).

However, the poll-block policy can do better. If the traffic is bursty, then the transition window [$\lambda^1_{max}, \lambda^2_{min}$] is examined to see if $\lambda^i > \lambda^1_{max}$ and $\lambda^i < \lambda^2_{min}$. If so, the $\lambda^i$ is inside the transition window and the poll-block policy can provide better results. This occurs in the transition between states as follows:

Case 1. $\lambda_i < \lambda^1_{max} < \lambda^2_{min}$: $P_i$ belongs to the bursty state. Therefore, poll.

Case 2. $\lambda_i > \lambda^2_{min} > \lambda^1_{max}$: $P_i$ belongs to the idle state. Therefore, block.

Case 3. $\lambda^1_{max} < \lambda_i < \lambda^2_{min}$: $P_i$ is inside the transition window. Therefore, poll (tp)-block.

The size of the transition window is left to the specification of the designer. However, certain guidelines need to be followed. By making the transition window tighter or smaller, the accuracy of the selection of the next state is increased. On the other hand, the window length cannot be zero because, when the window size is zero, the selection of the poll (tp)-block policy is precluded.

Several techniques illustrate the application of the invention to adaptive selection of poll vs. block when there is a deadline either for the CPU utilization or the latency. One approach for using the transition window is to fix the value of the $\lambda^1_{max}$ parameter as the same value as that specified for the interrupt latency. On the other hand, if a deadline is specified for either the CPU utilization or for the maximum latency of arrival, then the following adaptive algorithm can be used. For example, where it is desired to optimize the CPU utilization, a deadline $U_d$ is given for a maximum value of the CPU utilization $U_{CPU}$ below which the arrival latency is minimized. However, for CPU utilization above this value, the goal then is to minimize the CPU utilization.

The flow chart in FIG. 6 shows how this algorithm is implemented. First, the inter-arrival time $\lambda_i$ 602 for an incoming packet is checked (606). If the packet time is as indicated at 608 (bursty) as noted in Case 1, or at 610 (idle) as noted in Case 2, then there is no need to take any action. If, however, the inter-arrival time $\lambda^i$ 602 for the incoming packet is within the transition window (Case 3), then the flow goes to test 612. There, a check is made of the current measurement for the CPU utilization. If the utilization $U_{cpu}$ is below the deadline $U_d$, then the parameter $\lambda^1_{max}$ is set to the specified reference value $\lambda^1_{max-ref}$ (616). On the other hand, if the utilization $U_{cpu}$ is above the deadline $U_d$, then the parameter $\lambda^1_{max}$ is set to a modified value, the reference value $\lambda^1_{max-ref}$ that is proportional to the ratio of the current CPU utilization and the deadline value: $U_{CPU}/U_d$ (618).

FIG. 7 shows a computer-readable medium in the form of a floppy disc 700 for containing the software implementation of the program to carry out the various steps of modeling the network traffic according to the present invention. Other machine readable storage mediums are fixed hard drives, optical discs, magnetic tapes, semiconductor memories, such as read-only memories (ROMs), programmable (PROMs), etc. The article containing this computer readable code is utilized by executing the code directly from the storage device, or by copying the code from one storage device to another storage device, or by transmitting the code on a network for remote execution.

While the invention has been described in combination with specific embodiments thereof, there are many alternatives, modifications, and variations that are likewise deemed to be within the scope thereof. Accordingly, the invention is intended to embrace all such alternatives, modifications and variations as fall within the spirit and scope of the appended claims.

What is claimed is:

1. A computer-implemented system, comprising:
    a processor; and
    a network interface in communication with the processor;
    wherein the processor is configured to minimize latency in data communication in network traffic based upon an inter-arrival time of individual data packets at the network interface by:
    a) applying a 2-state Markov modulated Poisson process (MMPP) algorithm useful for determining whether the packet arrival rates are 'bursty' ($\lambda^1$) representing heavy traffic conditions or 'idle' ($\lambda^2$) representing light traffic conditions to network traffic at the network interface;

b) wherein a transition window $[\lambda^1_{max}, \lambda^2_{min}]$ is represented by boundary values $\lambda^1_{max}$ for the inter-arrival time for bursty traffic, and $\lambda^2_{min}$ for the inter-arrival time for idle traffic, c) wherein the processor is configured to determine a probability $\rho^1$ that a packet inter-arrival time is occurring in bursty traffic or a probability $\rho^2$ that the arrival time is occurring in idle traffic, and d) wherein the processor is configured to, based upon said probability $\rho^1$ or $\rho^2$ determination, either block or poll a transfer of data packets.

2. The system according to claim 1, wherein the processor is further configured to carrying out a modeling and analysis of network traffic in real-time.

3. The system according to claim 1 wherein the processor is configured to assign a mean value of $\lambda^1_{mean}$ to a bursty packet inter-arrival time and to assign a mean value of $\lambda^2_{mean}$ to an idle packet inter-arrival time and wherein $\lambda^2_{mean} \ll \lambda^1_{mean}$.

4. The system according to claim 3, wherein the processor is configured to default to a single state MMPP model as $\lambda^2_{mean}$ approximates $\lambda^1_{mean}$.

5. The system according to claim 1, wherein the processor is further configured to track changes in the values of $\lambda^1_{max}$ and $\lambda^2_{min}$ over time and to enlarge or decrease the size of the transition window based upon relative changes in the values.

6. The system according to claim 5, wherein the processor is configured to track the changes by computing a mean inter-arrival time of a plurality of packets.

7. The system according to claim 1, wherein the processor is configured to synchronize a user process with a completion of a receive operation at the network interface, and to determine a burst length during the bursty state by an interrupt latency time.

* * * * *